June 26, 1962  A. SCHMERMUND ET AL  3,040,862

PACKING MACHINES

Filed Jan. 23, 1961  4 Sheets-Sheet 1

June 26, 1962 A. SCHMERMUND ET AL 3,040,862

PACKING MACHINES

Filed Jan. 23, 1961 4 Sheets-Sheet 3

PACKING MACHINES

Filed Jan. 23, 1961 4 Sheets-Sheet 4

United States Patent Office 3,040,862
Patented June 26, 1962

3,040,862

PACKING MACHINES

Alfred Schmermund, 62 Kornerstrasse; Erich Beermann, 11 Strandbadstrasse; and Siegfried Knecht, 111 Milsper Strasse, all of Gevelsberg, Germany Filed June 23, 1961, Ser. No. 84,231
Claims priority, application Germany Jan. 29, 1960
16 Claims. (Cl. 198—24)

The invention relates to packing machines and more specifically to machines for automatically forming assemblies of predetermined numbers of similar packets of articles. For example, cigarettes are usually packed in small cartons, boxes or wrappers to form packets. A number of such packets, for example 25 packets, are in turn assembled into larger units.

In connection with such machines, it is already known automatically to remove faulty packets prior to the packets being assembled into the larger units, for example packets which do not contain a prescribed number of articles such as cigarettes. However, the removal of a packet disturbs the usual cycle of operations in the formation of the larger units.

It is an object of the invention to overcome this drawback.

It is a more specific object of the invention to provide means for adding a replacement packet when a faulty packet has been removed.

It is another object of the invention to provide means for ejecting a faulty packet by a replacement packet to be added.

It is a further object of the invention to provide means for adding a replacement packet at one end of a guide path when a faulty packet has been removed at the other end of the guide path.

It is still another object of the invention to provide means for ejecting a faulty packet by a next succeeding packet and to add a replacement packet at a place different from the place at which the faulty packet has been ejected.

These and other objects and advantages of the invention will become apparent to those skilled in the art from the following detailed descripiton of two embodiments of the invention which are illustrated in the accompanying drawings and in which.

Figure 1:
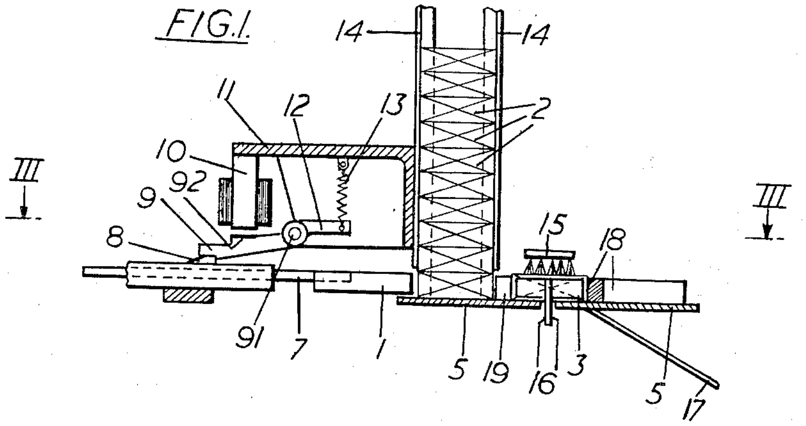
FIG. 1 is a section through an embodiment of the invention.
Figure 3:
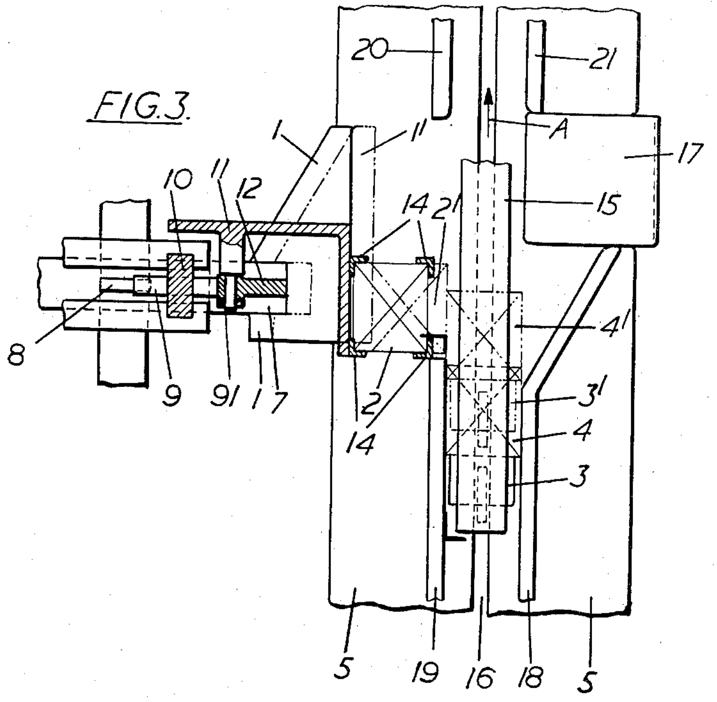
FIG. 3 is a section along the line III—III of FIG. 1.
Figure 2:
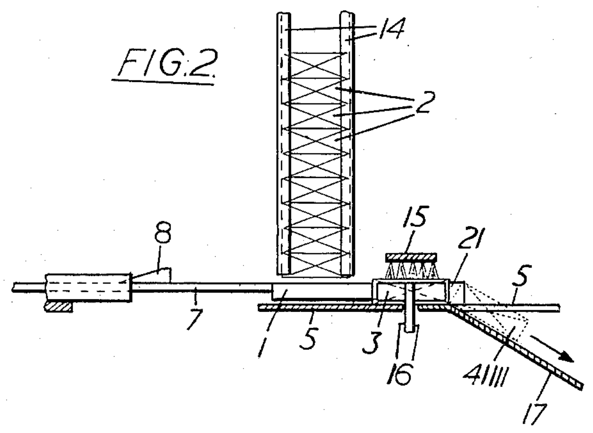
FIG. 2 shows the embodiment of FIG. 1 in a different position.

The embodiment of FIGS. 1 to 4 comprises a table 5 having guide rails 18, 19, 20 and 21 forming a guide path along which a series of packets 4 are caused to travel in the direction of the arrow A by means of push members 3 shanks of which extend through a slot 16 in the table 4, and which are operated from underneath the table in a manner known per se. A magazine 14 for containing replacement packets 2 is provided adjacent the guide path where the guide rails 19 and 20 form a gap between them and the guide rail 18 is bent outwardly away from the guide path as can best be recognized from FIG. 3. The magazine 14 is mounted to a frame (not shown) of the machine so that a gap is formed between the table 5 and the adjacent end of the magazine 14 so that the replacement packet immediately adjacent the table 5 is not restrained by the magazine 14 and can be pushed through the gap between the table 5 and the magazine 14 along said table by means of a reciprocatable slide 1 having a shank 7. The shank 7 has a projection 8. A locking lever 9 is pivotally mounted at 91 to a bracket 11 fixed to the magazine 14. The lever 9 has an abutment at one arm for co-operation with the projection 8. A spring 13 is connected to the other arm 12 of the lever 9 and to the bracket 11, the spring urging the lever 12 into a position in which its abutment bears against the projection 8. The lever 9 also carries an armature 92 of an electro-magnet 10, so that when the electro-magnet is energized, the lever 9 is turned against the action of the spring 13 and disengages the projection 8. A braking brush 15 and a chute 17 are provided.

Figure 4:
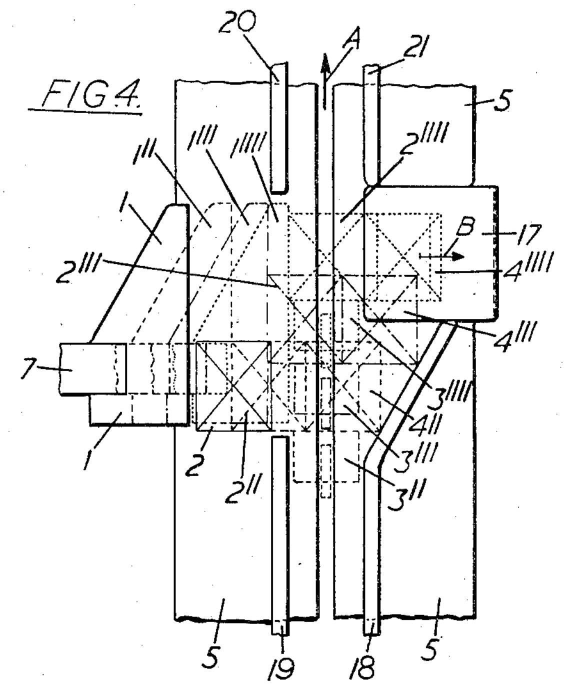
FIG. 4 is a view similar to that of FIG. 3 but indicating various different positions.
Figure 5:
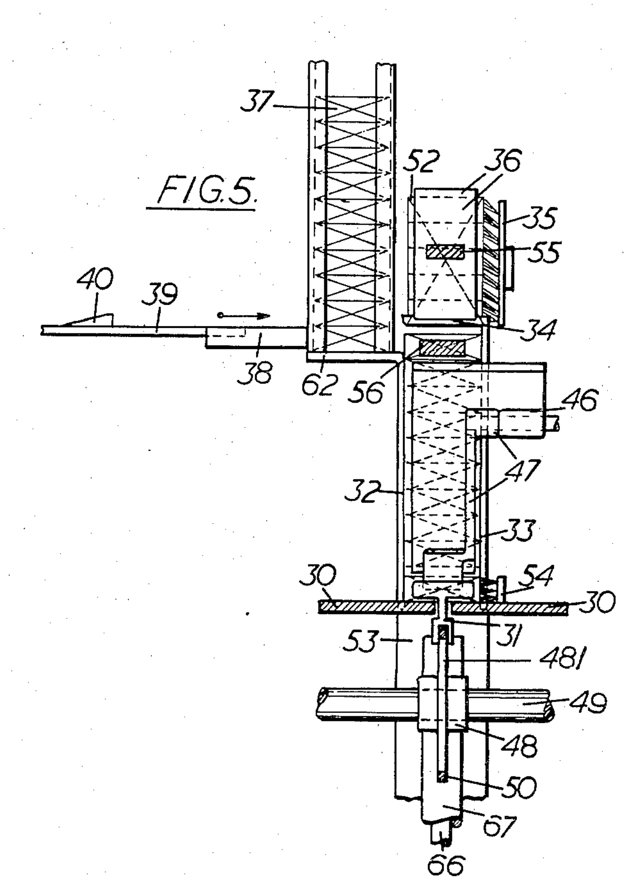
FIG. 5 illustrates an end view, partly in section, of another embodiment of the invention.

The embodiment described operates as follows:

Packets 4 are pushed along the table 5 by push members 3 between the rails 18, 19 and 20, 21 in known manner. Replacement packets 2 are inserted, for example, manually in the magazine 14. When a faulty packet 3 reaches the position adjacent the magazine 4 it is sensed in a manner known per se in the art, and the electro-magnet 10 is energized. Thus, the electro-magnet 10 is responsive to the presence of a faulty packet. When the electro-magnet 10 responds armature 92 is attracted and the lever 9 turned about its pivot 12, whereby the lever 9 disengages the projection 8 and renders the slide 1 operative, which is allowed to be reciprocated by any suitable known mechanism (not shown). The slide 1 pushes the lowermost replacement packet 2 out of the magazine 14 into the guide-path of the packets 4, the replacement packet 2 in turn pushing the faulty packet 4 sideways in the direction of the arrow B of FIG. 4 out of the said guide path along the bent-outward part of the guide rail 18 until it reaches the chute 17 to drop into a collecting container (not shown). The operating head of the slide 1 with which it contacts an adjacent side of the replacement packet 2 is longer than the said side so that the slide head remains in contact with the replacement packet when the replacement packet has partly entered the guide path and is pushed in the direction of the arrow A by a push member 3 until it is fully located within the guide path. FIG. 4 illustrates various positions $\mathbf{1}$, $\mathbf{1}^{11}$, $\mathbf{1}^{111}$, $\mathbf{1}^{1111}$ of the slide, $\mathbf{2}$, $\mathbf{2}^{11}$, $\mathbf{2}^{111}$, $\mathbf{2}^{1111}$ of the replacement packet, $\mathbf{3}^{11}$, $\mathbf{3}^{111}$, $\mathbf{3}^{1111}$ of the push member 3, and $\mathbf{4}^{11}$, $\mathbf{4}^{111}$, $\mathbf{4}^{1111}$ of the faulty packet 4. The positions $\mathbf{1}^{1}$, $\mathbf{2}^{1}$, $\mathbf{3}^{1}$, $\mathbf{4}^{1}$ (see also FIG. 3) have to be reached before the pull member 3 arrives at the position $\mathbf{3}^{11}$ so that the replacement packet 2 will lie in front of the pull member 3.

When the faulty packet 4 has been removed and replaced by a replacement packet 2, the electro-magnet 10 is released and the locking lever 9 is urged by the spring 13 to turn away from the electro-magnet 10, whereby the slide 1 on its return stroke is re-locked in its retracted position by the projection 8 re-engaging the abutment on the lever 9. The arrangement is now ready for a next cycle of operation.

FIGS. 5 to 8 illustrate a modified embodiment of the invention.

The modified embodiment comprises a slotted table 30 along which push members 31 move packets in the direction of the arrow C. The push members 31 are fixed to a movable belt 50 operable by a wheel 481 on a hub 48 keyed to a shaft 49 driven by any suitable drive, the push member 31 extending through the slot in the table 30. A lever 47 having an angularly arranged push head is rotatably mounted to a bracket by a pivot 46 and is osciltatable about the pivot 46. The said bracket is fixed to a wall 45 of a box for packets, other walls of which are indicated by reference numerals 32 and 33. The push member 31 has recesses 60 through which the head of the lever 47 can pass when oscillating in an anti-clockwise direction as viewed in FIG. 6. The box has a lid 34. A magazine 61 is provided for replacement packets 37. A reciprocatable slide 38 for pushing a replacement packet 37 out of the magazine 61 has a shank 39 carrying a projection 40 for co-operation with an abutment of a lever corresponding to the lever 9 of the first embodiment and operable by an electro-magnet corresponding to the electro-magnet 10 of the first embodiment. A reciprocatable slide 56 serves for pushing packets, one at a time, out of the box. A further reciprocatable slide 55 having a head 36 serves for moving a predetermined number of packets 52 (in the embodiment illustrated five such packets) simultaneously onto a delivery table 42 for the predetermined numbers of packets such as 57, 58, 59. Brushes 35, 41 and 54 are provided for braking movement of respective packets. A chute 53 serves for guiding removed faulty packets into a collecting container not shown. An electromagnet 101 is provided for operating a lever arm 65 of a lever 63 against the action of a spring 69, the lever 63 having an abutment for bearing against a projection 64 of a push slide 66 guided in a sleeve 67 and carrying a plate 68 for supporting packets. A further push slide 43 is provided adjacent one end of the delivery table 42. A plate 62 is fixed to the wall 32 of the box and forms a bottom for the magazine 61.

The second embodiment described operates as follows: Packets are pushed in the direction of the arrow C by the push members 31. When the push members 31 turn about a wheel 481, they release the respective packets which then are pushed onto the plate 68 at the lower end of the box formed by the walls 32, 33, 44 and 45 by the lever 47. In normal use, the electro-magnet 101 is deenergized and the lever 63 under the action of the spring 69 disengages the projection 64 so that the push slide 66 can freely reciprocate under the action of any suitable mechanism known per se. When the push slide 66 moves upwards in the direction of the arrow D it pushes the packet resting on the plate 68 into the said box where it is held in known manner, for example by friction exerted on the packet by the box walls. The packets in the box are pushed upwards. When the uppermost packet reaches the lid 34 of the box it is pushed out of the box by the slide 56 when moving in the direction of the arrow E onto the further push slide 43 which when moving in the direction of the arrow F pushes the packet thereon into the head 36 where the packets therein are held in any convenient manner. When a predetermined number of packets 52, in the drawings five packets, are assembled they are deposited simultaneously on the delivery table 42 when the further slide 55 moves in the direction of the arrow G. The assemblies of packets 57, 58, 59 are pushed along the delivery table 42 on each operative stroke of the said further slide 55.

When a faulty packet reaches the plate 68 or is about to reach the same, it is sensed in known manner whereby the electro-magnet 101 and the electro-magnet corresponding to the electro-magnet 10 of the first embodiment are energized. Thus, the said electro-magnets are responsive to the presence of a faulty packet. The electro-magnet 101 turns the lever 63 so that its abutment engages the projection 64 and prevents the push slide 66 to move in the direction of the arrow D so that the faulty packet now deposited on the plate 68 is not pushed into the box. When now the next packet is pushed onto the plate 68 by the lever 47 the said next packet pushes the preceding, faulty, packet from the plate onto the chute 53 for removal, whereupon the electro-magnet 101 is de-energized and the push slide 66 is released for further operation. During the time the push slide 68 was arrested, no packet could reach the lid 34 of the box and the slide 56 could not push a packet onto the further push slide 43. Instead, the slide 38 was released by its magnet responding, was thus rendered operative and pushed a replacement packet 37 out of the magazine 61 along the plate 62 into the box underneath the lid 34 so that the replacement packet is now fed by the slide 56 onto the further push slide 43 for being pushed into the head 36.

Figure 8:
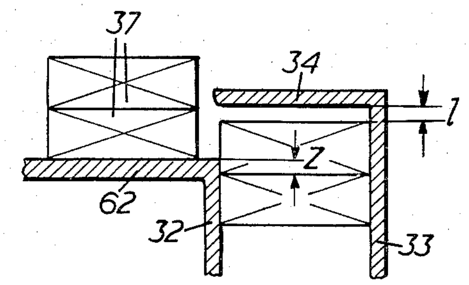
FIG. 8 shows a detail of the embodiment of FIGS. 5 and 6 on a larger scale and partly in section.
Figure 6:
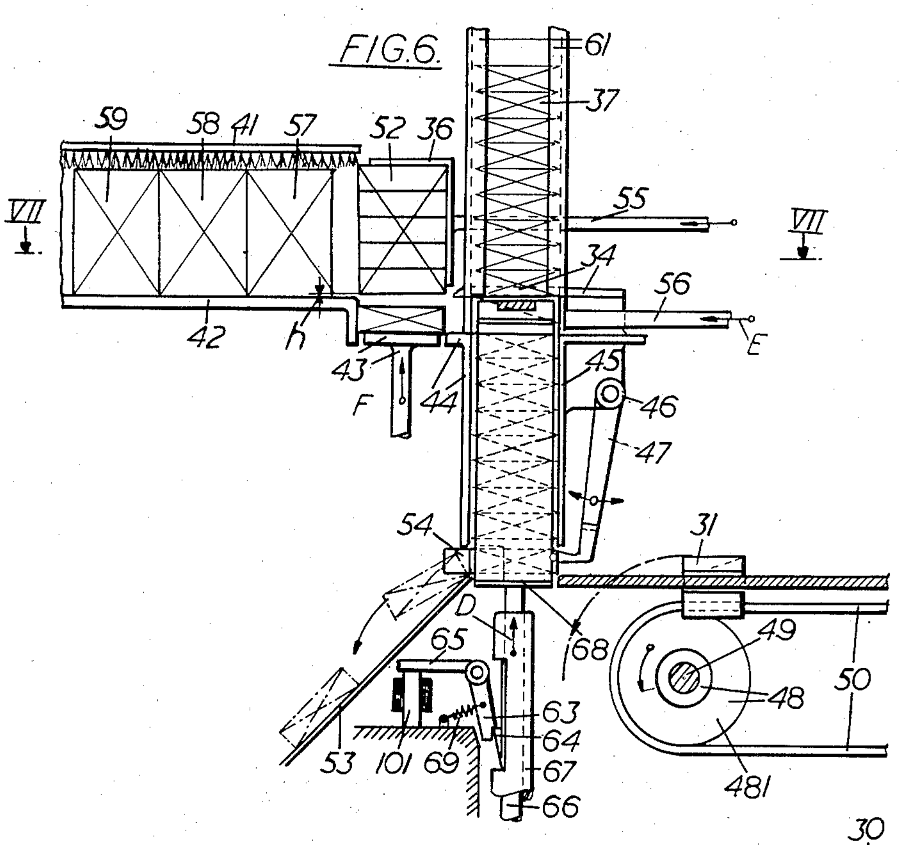
FIG. 6 is a side view, partly in section, of the embodiment of FIG. 5.
Figure 7:
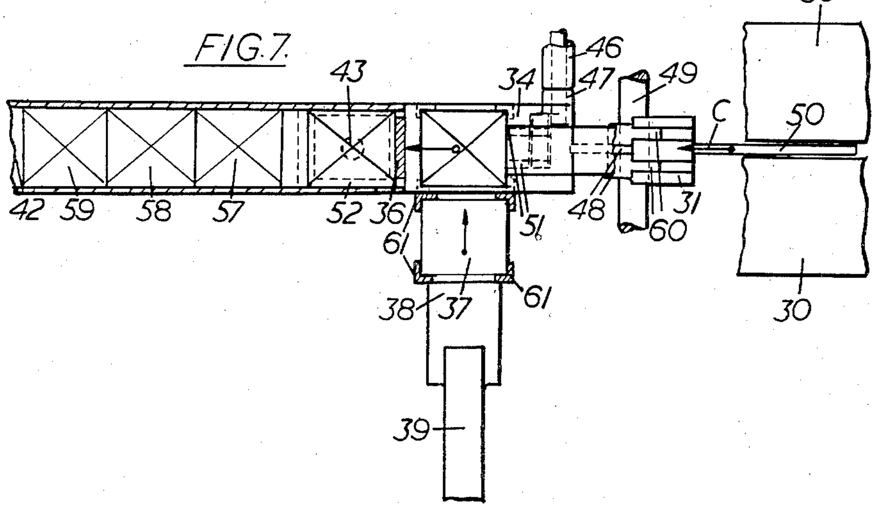
FIG. 7 is a section along the line VII—VII of FIG. 6.

As indicated in FIG. 8, the plate 62 which forms the bottom of the magazine 61 lies by a distance $z$ above the last but one packet in the box since the packets in the box have to "breathe" and small tolerances in the level of the uppermost packet have to be taken into account. For similar reasons, the lowermost packet 52 in the head 36 is by a distance $h$ (see FIG. 6) higher than the delivery table 42. Finally, the uppermost packet in the box has a distance $l$ (FIG. 8) from the lid 34 of the box. The distances $z$, $h$, $l$, are found by trial and error and serve to allow for tolerances in the dimensions of the packets. The brushes 35, 41, 54 brake movement of the respective packets. Analogous brushes or similar means are provided if necessary in various magazines or the like for preventing packets from falling down.

Modifications are possible. For example, instead of feeding a replacement packet into the box, the arrangement may be such that the replacement packet is fed directly onto the further push slide 43.

It should be clearly understood that the embodiments described with reference to the accompanying drawings are given by way of example only and that many modifications, additions and omissions are possible without departing from the spirit of the invention.

We claim:

1. A packing machine for forming an assembly of a number of packets, comprising means responsive to the presence of a faulty packet in a series of packets to be assembled, a magazine for housing replacement packets, means for removing the faulty packet from the series of packets and for feeding a replacement packet from the magazine to the series of packets, and means for rendering said feeding means operative when said responsive means are operated owing to the presence of a faulty packet in the series.

2. A machine as defined in claim 1, wherein said feeding means comprise a slide arranged so that the replacement packet, when fed by said slide to said series, ejects the faulty packet.

3. A machine as defined in claim 2, wherein said rendering means comprise means for locking said slide in an inoperative position, said locking means being releasable by said responsive means to render said slide operative when said responsive means respond to a faulty packet.

4. A machine as defined in claim 2, wherein said slide has an operative head for acting on an adjacent side of the replacement packet, said head being longer than said adjacent side.

5. A machine as defined in claim 1, and comprising means for braking the feed movement of said replacement packet after it has been fed to said series of packets.

6. A machine as defined in claim 5, wherein said braking means comprise a brush.

7. A machine as defined in claim 1, and comprising means forming a guide path along which, in use, said series of packets travel, said magazine being arranged adjacent said guide path.

8. A magazine as defined in claim 1, and comprising a first guide for said series of packets, supply means, a reciprocatable plunger at an input end of said first guide, and means for alternately operating said supply means and plunger for supplying a packet to an input end of said first guide and pushing the supplied packet along said first guide.

9. A machine as defined in claim 8, and comprising means for arresting said plunger in a retracted position when said responsive means are operated, whereby the packet last supplied to said first guide is ejected therefrom by a next packet when supplied by said supply means to said first guide.

10. A machine as defined in claim 9, wherein said magazine and said feeding means are arranged at an output end of said first guide for feeding a replacement packet to said output end when a packet has been ejected at said input end of said first guide.

11. A machine as defined in claim 10, wherein said first guide is arranged vertically, said input end being the lower end, and said output end being the upper end, of said first guide.

12. A machine as defined in claim 11, and comprising a second vertical guide, first means for transferring each packet individually from said first guide to said second guide, a collecting table, and second means for transferring a predetermined number of packets simultaneously from said second guide to said collecting table.

13. A machine as defined in claim 12, wherein said first transferring means comprise a horizontally reciprocatable slide, a vertically reciprocatable slide, a head on said vertically reciprocatable slide, and a holding finger, said horizontally reciprocatable slide being arranged for feeding each packet from said first guide onto said head of said vertically reciprocatable slide which is arranged for pushing, in co-operation with said holding finger, the packets in steps up said second guide.

14. A machine as defined in claim 13, wherein said magazine is arranged adjacent said output end of said first guide, said feeding means being arranged for feeding a replacement packet onto said head of said vertically reciprocatable slide.

15. A machine as defined in claim 3, wherein said responsive means comprise an electro-magnet for releasing said locking means.

16. A machine as defined in claim 9, wherein said responsive means comprise an electro-maget for arresting said plunger.

References Cited in the file of this patent

UNITED STATES PATENTS 1,609,802 Ekstrom et al. ---------- Dec. 7, 1926